H. PERROT.
MACHINE FOR CUTTING INVOLUTE SPUR GEARS.
APPLICATION FILED OCT. 9, 1911.

1,088,173.

Patented Feb. 24, 1914.

3 SHEETS—SHEET 1.

WITNESSES:
T. J. Wallace
René Bruine

INVENTOR:
Henri Perrot,
By Attorneys,
Fraser, Turk & Myers

H. PERROT.
MACHINE FOR CUTTING INVOLUTE SPUR GEARS.
APPLICATION FILED OCT. 9, 1911.

1,088,173.   Patented Feb. 24, 1914.

INVENTOR:
Henri Perrot
By Attorneys,

H. PERROT.
MACHINE FOR CUTTING INVOLUTE SPUR GEARS.
APPLICATION FILED OCT. 9, 1911.
1,088,173.        Patented Feb. 24, 1914.
3 SHEETS—SHEET 3.
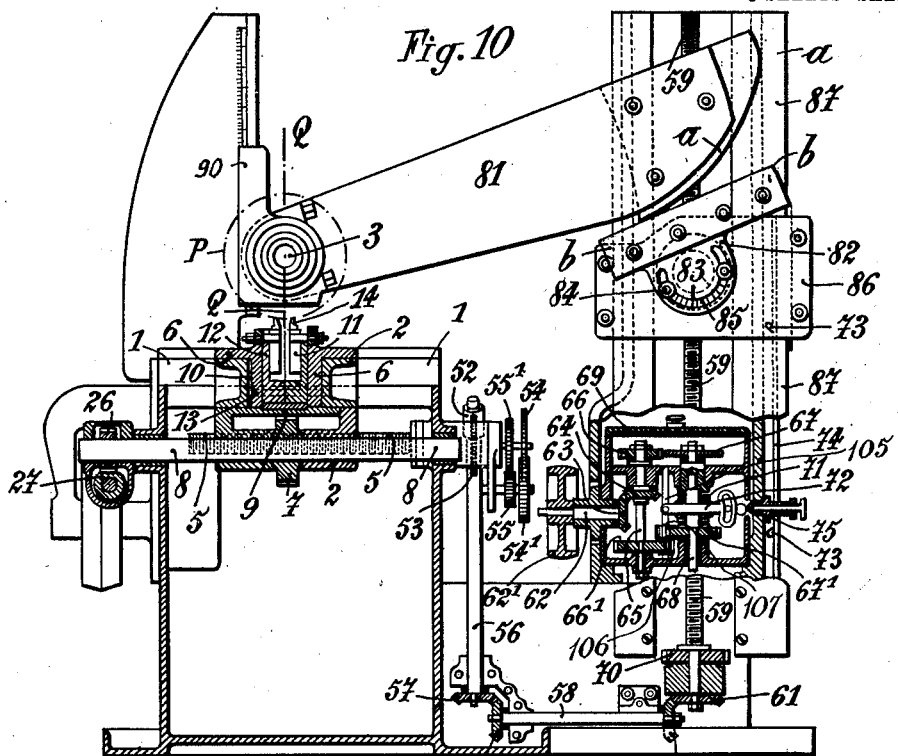
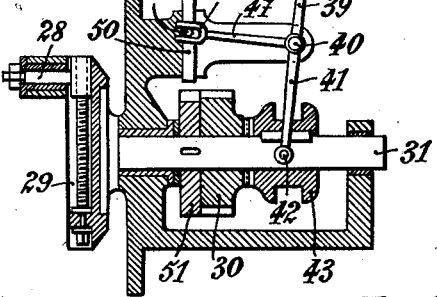
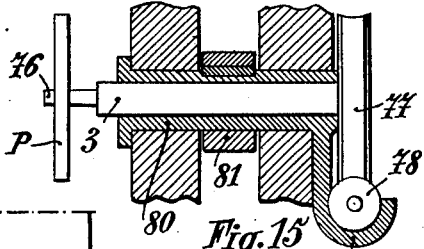
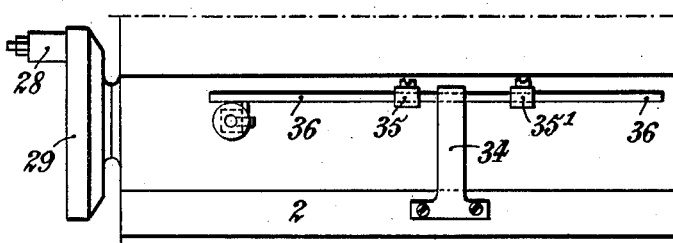
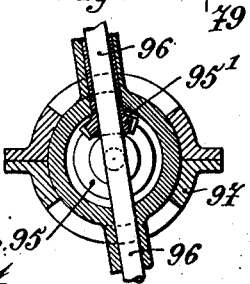
WITNESSES:
J. F. Wallace
René Bruine
INVENTOR:
Henri Perrot
By Attorneys,
Fraser, Burk & Musser

UNITED STATES PATENT OFFICE.

HENRI PERROT, OF CARDROSS, SCOTLAND.

MACHINE FOR CUTTING INVOLUTE SPUR-GEARS.

1,088,173.  Specification of Letters Patent.  Patented Feb. 24, 1914.

Application filed October 9, 1911. Serial No. 653,715.

*To all whom it may concern:*

Be it known that I, HENRI PERROT, a citizen of the Republic of France, residing in Cardross, Dumbartonshire, Scotland, have invented certain new and useful Improvements in Machines for Cutting Involute Spur-Gears, of which the following is a specification.

This invention relates to machines which are adapted to generate teeth on gear wheels of different sizes without the need of substituting or changing any of the parts of the machines and which comprise mechanisms that may be so adjusted that any size gear-blank to be cut may be rotated at the same speed as that of a pair of reciprocating tools that act on the two sides of a tooth at one time, and it consists in improvements having for their object an improved machine for cutting involute teeth on spur gearing, the principle of which will be explained below.

Figure 8:
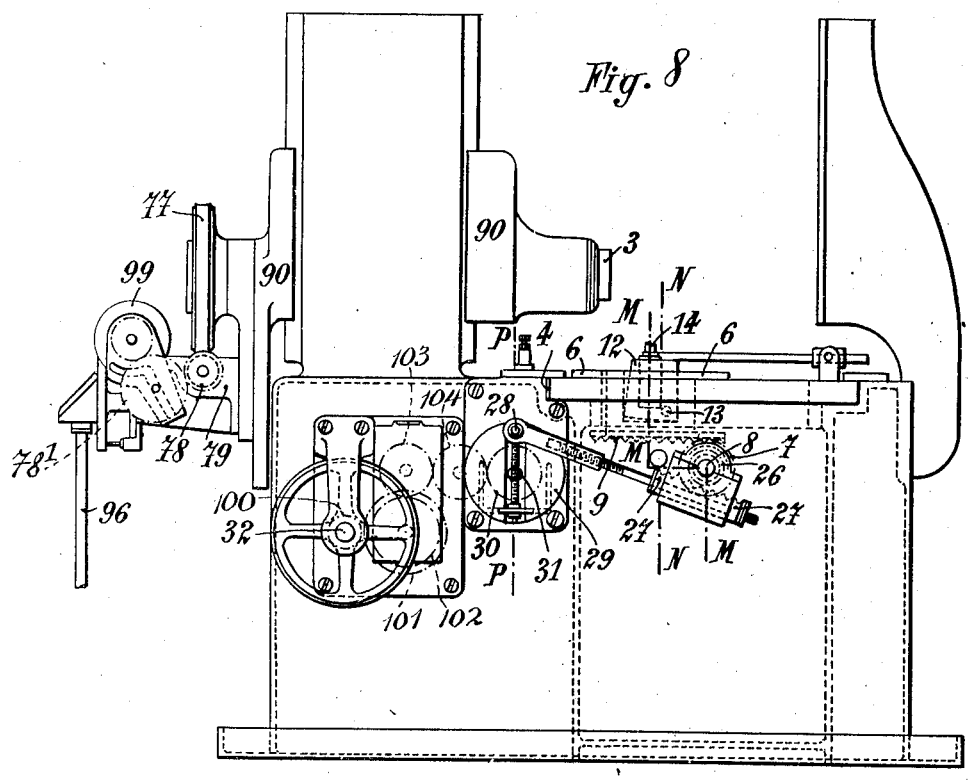
Figure 9:
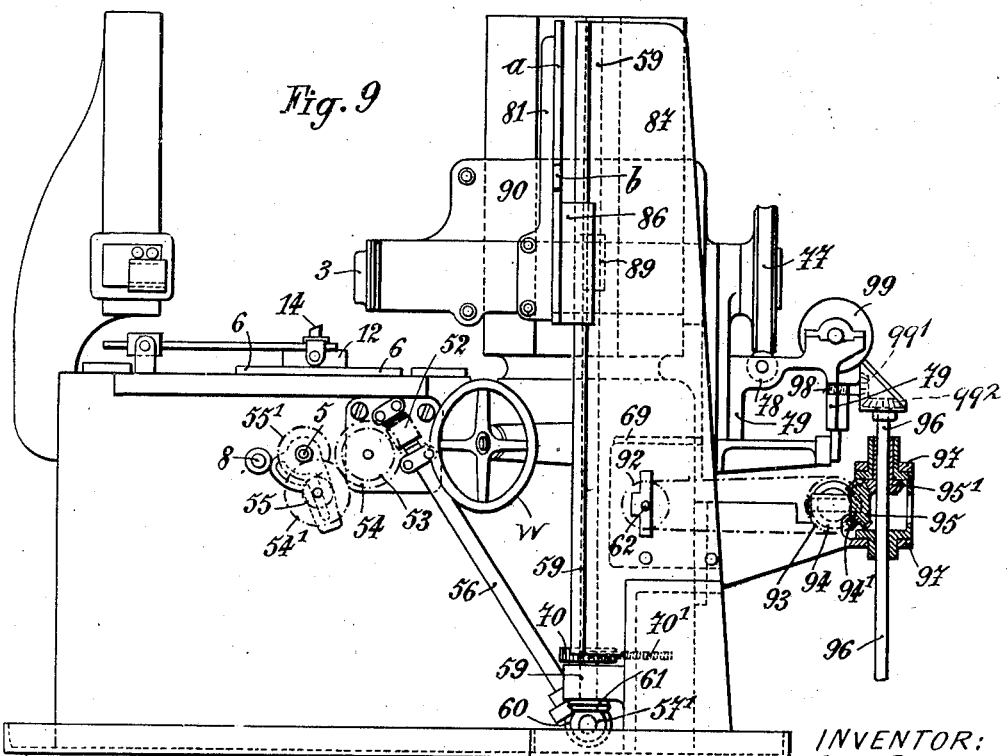

Figures 1 to 7 inclusive are diagrammatic views illustrating certain principles involved in the present invention. The machine, the object of this invention and constructed on the above-stated principles, is illustrated in Figs. 8 to 15 inclusive. Fig. 8 is an elevation of one side of the machine. Fig. 9 is an elevation of the other side of the machine. Fig. 10 is a longitudinal section on the lines M—M, N—N, Fig 8. Fig. 11 shows a detail of the traversing screw and tool carriage. Fig. 12 is a view of a portion of the carriage actuating mechanism partially in section on the line P—P, Fig. 8. Fig 13 is a partial plan view, showing portions of the mechanism illustrated in Fig. 12, and a portion of the carriage. Fig. 14 is a sectional view on the line Q—Q, Fig. 10, of a portion of the mechanism. Fig. 15 is a sectional view of a portion of the mechanism shown in Fig. 9.

All the gears that can gear with one and the same straight rack are developable and can gear with one another. If OC (Fig. 1) is taken as the radius of the pitch circle of the spur wheel in gear with a rack the direction of which is $xy$, OA as the radius of the involute base circle, AC being tangent to that circle, the angle $\alpha$ formed by that tangent and the line $xy$, which is perpendicular to OC, is the angle of obliquity of action and the tangent AC is the locus of the points of contact of the flank PQ constituted by the involute of the base circle of radius OA and of the straight flank MN of the rack; then $$OC = \frac{OA}{\cos \alpha}.$$

Figure 2:
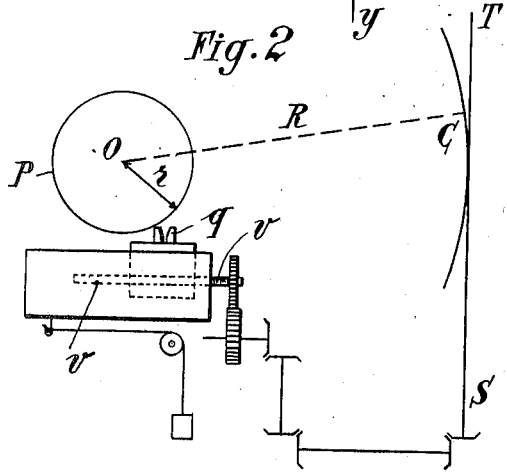
Figure 3:
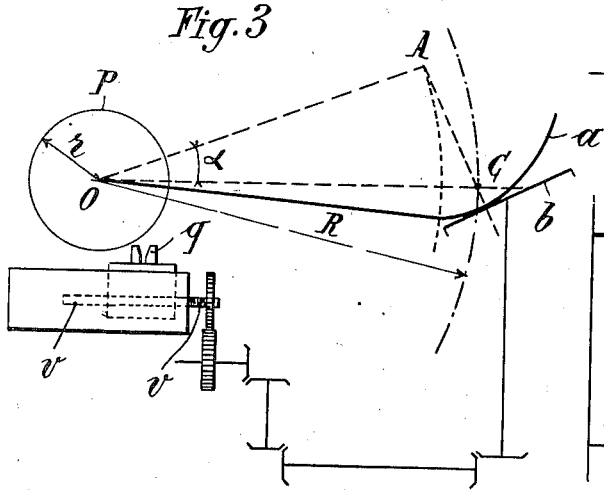
Figure 4:
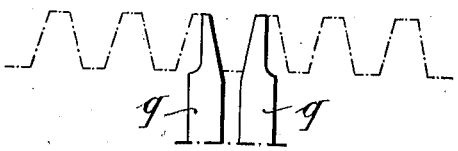
Figure 5:
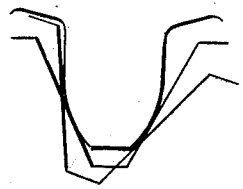

If $\alpha$ is varied without changing OA, that is to say without changing the involute, then the pitch circle radius OC may be varied by quantities as small as may be desired. Supposing that OC in Fig. 2 is the pitch radius R of a large toothed sector meshing with a rack TS movable vertically by means of a screw, that the axle of the sector carries a pinion P of radius $r$ the teeth of which are to be cut by the tools $q$ mounted on a carrier adapted to be displaced horizontally by a screw $v$. Supposing again, that the screw $v$ of the carrier and the screw that controls the rack are connected by intermediate shafts and bevel wheels, with reducing gears interposed in such a manner that the velocity ratio of the carriage and of the rack TS equals the ratio between the radius of the pinion and the radius of the sector, that is $\frac{r}{R}$. If the tools have a movement parallel to the breadth of the pinion P to be cut and the carrier which carries them advances regularly according to the displacement of the rack TS, then the sector and the pinion to be cut having accordingly a corresponding angular displacement, the tooth of the pinion P will be cut with an involute profile. If, for example, a wheel of 51 teeth with a diametral pitch of 3.25 (the quotient obtained by dividing the diameter of the pitch circle by the number of teeth in the wheel) has to be cut, and the pitch radius of sector R be 630 mm. then $$\frac{r}{R} = \frac{25.5 \times 3.25}{630} = \frac{13 \times 17}{80 \times 21}$$

for example, that is to say with gears of 80, 21, 13 and 17 teeth the desired ratio $\frac{r}{R}$ can be attained. This shows that, for a sector of pitch radius R, it is necessary to change the gears for cutting pinions of different radii $r$; a large number of intermediate gears have been required for cutting pinions for which the ratio $\frac{r}{R}$ varies considerably.

The object of the present invention is to permit, as will be understood from what follows, the desired result to be obtained, that is to say to cut pinions for which the ratio $\frac{r}{R}$ varies within certain limits, without having to change the intermediate gears within these limits.

Figure 1:
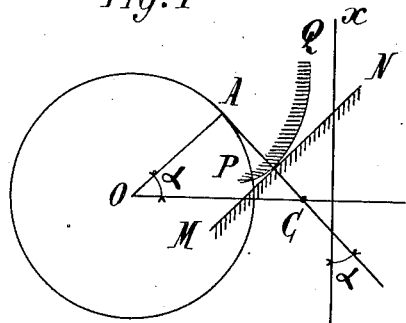

It has been previously seen in regard to Fig. 1 that if the angle of obliquity of action $\alpha$ is modified without changing OA, that is without modifying the involute, OC may be varied as desired. If then in Fig. 2 the toothed sector of radius R is replaced by a cam $a$ in the form of an involute as in Fig. 3 and if the vertically movable rack of Fig. 2 is replaced by a bar making with OC an angle $\alpha$ and representing a flank of the rack on which the cam rests, the system of the intermediate gears up to the rack of the tool carriage remaining the same, then the angle $\alpha$ can be varied, OC modified and consequently also the ratio $\frac{r}{R}$; therefore with the same cam $a$, pinions of different diameters can be cut by merely modifying the inclination of the bar $b$.

Another object of the invention is to produce a machine of cut gears tooth by tooth, the two sides of a tooth being cut at one time. The cutting is effected by means of two tools (Fig. 4) the flanks of which correspond with the sides of a space between the rack teeth. If a succession of positions of the flanks of two successive teeth of the rack and the flanks of a tooth of a wheel engaged in the space be considered, it is seen the flanks of the teeth of the wheel are constituted by a curve tangent to the flanks of the rack in all positions.

Figure 6:
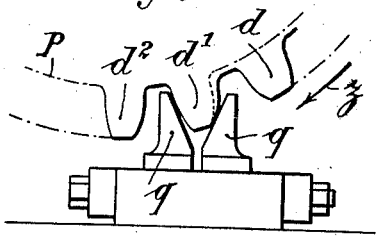
Figure 7:
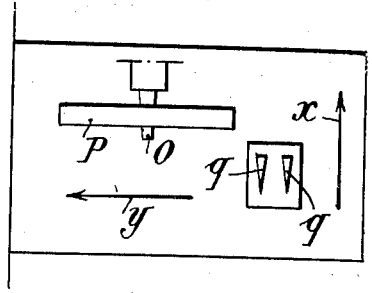

The teeth of the wheel to be cut are roughly formed beforehand as shown in Fig. 6, where $d$ represents a tooth roughly formed, $d^1$ indicates a tooth in course of being cut and $d^2$ shows a completely cut tooth; the two tools while being traversed reciprocate parallel to the axis of the pinion as indicated in Fig. 7, the tools cut in one direction of movement and return back without working or cutting. While the cutting is taking place in the direction of arrow $x$ the two tools are displaced along the direction of arrow $y$ and at the same time the pinion being cut is subjected to an angular movement in the direction of the arrow $z$ (Fig. 6). This goes on until the cutting of the tooth is complete, which then takes the profile seen in broken lines at $d^1$ Fig. 6. Fig. 7 is a plan, to a smaller scale, of the arrangement in Fig. 6.

The frame of the machine carries a slide way 1 for a carriage or carrier 2 which supports the tool holder hereafter described; the axis of the slide 1 is perpendicular to the axle 3 of the pinion-carrier mandrel. A wedge piece 4 may be employed for adjusting purposes (Fig. 8).

The carriage 2 is shifted by the screw 5 (see Fig. 11). The carriage has two limbs $2^1$ which support a pair of nuts $2^2$, in which the screw 5 engages. The interior of the carriage serves as a guide for the sliding case or frame 6 which is reciprocated parallel to the axis of the mandrel. The displacement of that case is effected by means of a pinion 7 carried by a spindle 8 and engaging with a rack 9 disposed below the said case 6. The tool carriers are arranged in the case 6; 10 is a wedge shape adjusting member for case 6. The tool carriers 11, 11 are disposed on a piece 12 pivoting on the axis 13 so as to permit the tool to free itself on its return stroke, that is when it is not operative.

The necessary reciprocative movement of the tools 14 is procured by means of the pinion 7 carried by the spindle 8. This spindle carries another pinion 26 which engages with a rack 27 (Figs. 8 and 10) which is correlated with a crank 28 of a crank disk 29. The crank 28 can be displaced in a slot formed in the disk 29 and be adjusted by a screw and nut; the travel of the rack 27 can be thus modified and accordingly the travel of the tool carrying frame 6, agreeably to the width of the pinion to be cut. The disk 29 receives its movement, as shown partly in Fig. 12, from the pinion 30 loose on spindle 31, which pinion is operated from a spindle 32 by intermediate gearing which can be modified according to requirements to vary the speed of the tools such as the gears 100, 101, 102, 103 and 104. When a tooth of the pinion is cut, the pinion is advanced so that a cutting of a second tooth may be commenced; during the angular displacement of the pinion the tool must be prevented from operating. The arrest of the tools in their rear position is attained thus (see Fig. 12 and Fig. 13); the carriage 2 carries an arm 34 adapted to engage one or other of two tappets or shoulders 35, $35^1$ on a bar 36, which is formed with two heels 37, $37^1$ adapted to contact with a finger 38 attached to lever 39. This lever 39 oscillates around a fixed axis 40 and terminates in a fork 41 the branches of which carry a roller 42 adapted to travel in the circular groove of a toothed coupling 43 carried by a feathered key on the shaft 31 and adapted to engage the clutch teeth of the pinion 30. The other extremity of lever 39 is provided with a roller 44 against which presses by reason of the spring 46 one or the other of the faces of a doubly coned or beveled piece 45, which is carried by the frame of the apparatus. The lever 39 is integral with an arm 47 ending in a fork 48 adapted to act upon a pin 49 attached to a finger 50 arranged to enter a notch formed on the periphery of a disk 51 fixed to the shaft 31 of the crank disk 29; the finger 50 enters the notch when the crank disk is in the dead point position. When a tooth to be cut is on the point of completion, the arm 34 comes against the shoulder 35 of the bar 36, the heel 37¹ of that bar acts on the finger 38 and pushes the lever 39. In this movement, the roller 44 rolls on one of the oblique surfaces of the piece 45 and raises it and compresses the spring 46; when the roller 44 reaches the apex of the piece 45, the spring 46 reacts sharply and causes the roller 44 to pass to the other oblique face of 45 and the lever 39 rapidly pivoting around 40, the clutch 43 is thrown out of gear and consequently the pinion 30 ceases to turn 43. So long as the bar 36 has not displaced the arm 34, the arm 47 is raised and consequently the finger 50 is withdrawn from the slot in disk 51, and that can turn; but when the lever 39 is swung over the arm 47 descends and pushes the finger 50 into the notch 51 which stops the crank disk and at the same time there is a disengagement of the clutch member 43 by the lever 39. It is at this moment that the pinion P to be cut receives its angular displacement and the tool carrying carriage returns back to its initial position to reduce another tooth on the said pinion. When the carriage approaches the end of the backward movement, the arm 34 acts on the shoulder 35¹ and the bar 36 moves the lever in a direction reverse to that previously. There is then an engagement of the clutch member 43 with the controlling pinion 30 and at the same time the finger 50 disengages from the notch in disk 51 and frees the crank disk. The rotation of the screw 5, in one or other direction according as the carriage is to advance toward the pinion to be cut to effect the cutting of the tooth or to withdraw, is produced (see Fig. 10) by a worm 52 engaging with a pinion 53 which imparts movement by intermediate gears 54, 54¹, 55, 55¹ which it is possible to modify according to the ratio $\frac{r}{R}$. The worm 52 receives movement by way of the shaft 56 and bevel gears 57, 57¹, the last carried by a shaft 58 operated by a shaft 59 by means of the bevel gears 60, 61. The shaft 59 is operated by the motor shaft 62 by the intermediate bevel gearing 63, 64 and shaft 65, the latter carrying two toothed wheels 66, 66¹. Wheel 66 engages with wheel 67, and 66¹ actuates wheel 67¹ by means of gears 106, 107 mounted on a shaft 105. The object is to produce motion in opposite directions by either wheels 67 or 67¹, the latter wheel being freely mounted on the shaft 68. The gears 66, 67 can be easily changed, the cover 69 of the casing which contains the gears being removable. The speed ratio can be thus modified, and accordingly the speed of the rotation of the shaft 68 and consequently of shaft 59, these two shafts being connected by the gears 70, 70¹ (Fig. 9). The gears 66¹, 67¹ and the intermediate gears 106, 107, by reason of their relative sizes, serve to effect the return of the tools with a speed greater than that with which they operatively advance. The shaft 68 (Fig. 10) is connected with one or other of the wheels 67, 67¹ by means of a double clutch coupling 71 which is actuated by a forked lever 72 on which act the arms or stops 73 of a movable bar 74; a spring urged double cone piece 75 has the same function as the piece 45 previously described. The bar 74 is displaced by the carriage which carries the oblique bar $b$ described below.

The angular displacement, to which the pinion P is subjected while the tools cut the flanks of a tooth, under conditions to be explained, is produced in the following manner: The pinion P is carried by a pin 76 (see Fig. 14) which is let into the end of shaft 3; this shaft carries a helicoidal wheel 77 which meshes with a worm 78. The worm 78 forms part of the spacing mechanism carried by a frame 79 connected with a hollow shaft 80, but is not described, as it constitutes no part of the invention and may be of any suitable character. The worm 78 is driven by means of suitable gearing 78¹ Fig. 8, actuating by means of the casing 99 a differential gear which also forms no part of the invention. This differential gear is itself driven by the worm 98 carried by the support 79 Fig. 9, and capable of oscillating around the axis of the pinion P. This worm 98 is connected with a bevel pinion 99¹ meshing with a second bevel pinion 99² carried by shaft 96 which is subsequently referred to. The shaft 80 carries keyed to it the nave of an arm or lever 81 having its edge fashioned to an involute curve $a$ (Fig. 10) the outline of which is determined as already explained with reference to Fig. 1. The heavy lever 81 reposes with its cam face $a$ on an oblique plate or bar $b$ which controls the progressive lowering of lever 81 and consequently the angular displacement, equally progressive, of pinion P, a displacement which is necessary to impart an involute profile to the flanks of a tooth of wheel P by means of tools with plane faces. The oblique bar $b$ is fixed by bolts on a support having a circular part 82 which can turn on an axle 83. The bolts 84 engage in a slot 85 to allow the inclination of the bar $b$ being modified and to fix the bar by means of nuts in the desired position. The slot 85 may be provided with a suitable graduated scale, whereby the inclination of the bar may be adjusted with precision. The axle 83 is supported by a carrier 86 (Figs. 9 and 10) which is displaced vertically on a guide of a frame 87 by means of a screw which forms the prolongation of shaft 59 and which is engaged by a nut 89 carried by the said carrier 86. This vertical shaft 59 is controlled as has been previously explained, and establishes the mechanical connection between the mechanism for the transverse displacement of the tool carrying carriage and that which displaces vertically the inclined bar to cause by means of the arm 81 an angular displacement of the pinion P. In the same manner as the return of the tool carriage is made more rapidly than the working advance, so the elevation of the oblique bar is accomplished more quickly than its descent which takes place during the period of the cutting of a tooth of the pinion. It may be borne in mind that the angular displacement of the pinion P is effected by operating the hollow shaft 80 which carries it by means of the worm 78 and the helicoidal wheel 77. This mechanism and the shaft which carries the pinion P are supported by a carrier 90 which can be displaced with respect to the frame 87 agreeably to the diameter of the pinion. The tubular shaft 80 is integral with the supports 79 for the worm 78 and the other parts of the spacing mechanism. The power shaft 62 which is driven by pulley $62^1$ carries a pinion 92 (Fig. 9) connected by a chain with a pinion 93 whose shaft transmits movement by the bevel pinions 94, $94^1$ and pinions 95, $95^1$ to the feathered shaft 96 which can move in the nave of the wheel $95^1$ according to the diameter of the pinion to be cut. This shaft 96 is held and guided by the support 97. As is understood, the support 79 can oscillate to some extent around the axis of the shaft of the pinion to be cut, the two bevel pinions $99^1$, $99^2$ remaining in mesh, while the shaft 96 is displaced longitudinally in its support which can oscillate around the axis of pinion 95. (See Fig. 15.)

By this machine, which has two independent tools, a pitch circle of any radius may be taken and a tooth having any desired thickness and any angle of obliquity may be cut. This is particularly useful for the cutting of certain gears for automobiles, which at times have profiles of a type out of the general run.

The working of the machine takes place in the following manner: The tools being placed in their tool holders, and properly set, the course of the tools is controlled as to length by adjusting the eccentricity of the pivot 28 (Figs. 8 and 12). If the thickness of the pinions to be cut is 30 millimeters, the course to be given to the tool is 40 mm. in order to allow the tool to clear the pinion. The course of the tools is further regulated by screwing or unscrewing the screw which forms a prolongation of the rack 27 (Fig. 8) so as to bring the stops in the travel of the tools at the entrance and exit of the teeth to be cut. The carriage 2 is then brought to one of its extreme positions by turning the screw 5 (the gearing $55^1$, represented in Fig. 10 not being in place) by the aid of a handle which is fitted on the axle of the gear $55^1$. The carrier 90, carrying the pinion to be cut, is lowered by operating the wheel W represented in Fig. 9, which wheel acts through the medium of conical pinions upon a screw engaging with the carrier 90. A graduated scale arranged along the slides of the carrier 90 is then consulted to determine the point at which one must stop in order to have the depth of tooth correspond to the model of the pinion to be cut. That done, the number of teeth which the gears 54, $54^1$, 55 and $55^1$ should have, and the inclination $\alpha$ which should be given to the bar $b$ is determined. $r$ being the original radius of the pinion to be cut, $\frac{1}{5}$ being the ratio of the reduction of the wheel 53 and of the tangent screw 52, R being the radius of the circumference of the base of a cam with an involute profile, we have:

$$\frac{r}{R \cos \alpha} = \frac{\text{wheel } 54 \times \text{wheel } 54^1}{\text{wheel } 55 \times \text{wheel } 55^1} \times \frac{1}{5}$$

The bar $b$ being inclined by the angle $\alpha$ thus determined, and the wheels 54, $54^1$, 55, $55^1$, being put in place, the position of the shoulders 35, $35^1$ (Figs. 12 and 13) is properly arranged, so that the tools may stop at their rear position when the tooth is cut, and that they may be again set in movement when the following tooth is ready to be cut. The stops 73 (Fig. 10) which control the mechanism for advancing and returning the carriage 2 are then set. Care should be taken to have the return of the carriage 2 begin after the stopping of the tools in their rear position, and to again set in motion these tools by the shoulder $35^1$ only when the return of the car 2 is completely ended. The spacing gears 77, 78, 79, etc., governing the rotation of the pinion P (Figs. 8 and 14) being put in place as well as the disengaging stop of the spacing apparatus, the gears controlling the movements of the cutting of the tools as well as those giving the speed of advance, (that is to say, the thickness of the shaving to be taken off being carefully chosen) they can be set going. At this moment the carrier 86 (Fig. 10) is at the bottom of its course and the carriage 2 is at the left; the carrier 86 ascends, the carriage 2 goes from left to right and the tooth is cut. When the cutting of the faces as regards two adjacent teeth is accomplished, the stop 34 (Figs. 12 and 13) comes to rest against the shoulder 35, the tools stop in their rear position, that is to say, entirely disengaged from the pinion. The lower stop 73 (Fig. 10) clutches the mechanism controlling the descent of the carrier 86, the carrier descending quickly, while the carriage 2 is displaced from right to left and while the dividing mechanism causes the pinion to be cut to revolve by a length equal to the pitch for the cutting of the following faces. The stop 34 acts upon the shoulder 35¹ and again sets the tools in operation, at the same time that the upper stop brings about the clutching for the ascending vertical displacement of the carrier 86 and the cutting of two new tooth faces opposite one another is effected, and so on.

Claims:

1. In a machine for cutting involute gears, the combination of a pinion-supporting mandrel, an arm having an involute cam thereon, mounted concentrically with and adapted to rotate said mandrel, an inclined support for said cam, a cutting tool having a feed transverse of said mandrel, and means for moving said support proportional to the transverse feed of said cutting tool.

2. In a machine for cutting involute gears, the combination of a pinion-supporting mandrel, an arm having an involute cam thereon, mounted concentrically with and adapted to rotate said mandrel, an inclined support for said cam, a cutting tool, means for feeding said cutting tool transversely of said mandrel; and gear connections between said support and tool feeding-means for moving said support proportional to the transverse feed of said cutting tool.

3. In a machine for cutting involute gears, the combination of a pinion-supporting mandrel, an arm having an involute cam thereon, mounted concentrically with and adapted to rotate said mandrel, an inclined support for said cam, a cutting tool, means for feeding said cutting tool transversely of said mandrel, gear connections between said support and tool feeding-means for moving said support proportional to the transverse feed of said cutting tool, said inclined support being adjustable, whereby the machine may be adjusted for cutting gears of different diameters without changing the ratio of movement between said support and tool feeding means.

4. In a machine for cutting involute gears, the combination of a pinion-supporting mandrel, an arm having an involute cam thereon, mounted concentrically with and adapted to rotate said mandrel, an inclined support for said cam, a cutting tool having a feed transverse of said mandrel, and means for moving said support proportional to the transverse feed of said cutting tool, said inclined support being adjustable, whereby the machine may be adjusted for cutting gears of different diameters without changing the ratio of movement between said support and tool feeding means.

5. In a machine for cutting involute gears, the combination of a pinion-supporting mandrel, an arm having an involute cam thereon, mounted concentrically with and adapted to rotate said mandrel, an inclined support for said cam, a cutting tool, a tool carrier having a feed transversely of said mandrel, and intermediate gearing between said tool carrier and inclined support, said inclined support being adjustable whereby the machine may be adjusted for cutting gears of different diameters without changing the ratio of movement between said support and tool carrier.

6. In a machine for cutting involute gears, the combination of a pinion-supporting mandrel, an arm having an involute cam thereon, mounted concentrically with and adapted to rotate said mandrel, an inclined support for said cam, a cutting tool, a tool carrier having a feed transversely of said mandrel, means for moving said cutting tool in said carrier longitudinally of said mandrel, and intermediate gearing between said tool carrier and inclined support, said inclined support being adjustable whereby the machine may be adjusted for cutting gears of different diameters without changing the ratio of movement between said support and tool carrier.

7. In a machine for cutting involute gears, the combination of a pinion-supporting mandrel, an arm having an involute cam thereon, mounted concentrically with and adapted to rotate said mandrel, an inclined support for said cam, a cutting tool, a tool carrier having a feed transversely of said mandrel, means for moving said cutting tool in said carrier longitudinally of said mandrel and means for adjusting the longitudinal movement of said cutting tool, and intermediate gearing between said tool carrier and inclined support, said inclined support being adjustable whereby the machine may be adjusted for cutting gears of different diameters without changing the ratio of movement between said support and tool carrier.

8. In a machine for cutting involute gears, the combination of a pinion-supporting mandrel, an arm having an involute cam thereon, mounted concentrically with and adapted to rotate said mandrel, an inclined support for said cam, a cutting tool, a tool carrier having a feed transversely of said mandrel, means for moving said tool carrier transversely with a movement away from the pinion to be cut of greater rapidity than toward the pinion to be cut, and intermediate gearing between said tool carrier and inclined support, said inclined support being adjustable whereby the machine may be adjusted for cutting gears of different diameters without changing the ratio of movement between said support and tool carrier.

9. In a machine for cutting involute gears, the combination of a pinion-supporting mandrel, an arm having an involute cam thereon, mounted concentrically with and adapted to rotate said mandrel, an inclined support for said cam, a cutting tool, a tool carrier having a feed transversely of said mandrel, and intermediate gearing between said tool carrier and inclined support, said inclined support being adjustable whereby the machine may be adjusted for cutting gears of different diameters without changing the ratio of movement between said support and tool carrier, and said mandrel having an adjustable support whereby it may be adjusted for pinions of different diameters.

10. In a machine for cutting involute gears, the combination of a pinion-supporting mandrel, an arm having an involute cam thereon, mounted concentrically with and adapted to rotate said mandrel, an inclined support for said cam, a cutting tool, a tool carrier having a feed transversely of said mandrel, and intermediate gearing between said tool carrier and inclined support, said intermediate gearing having a change-speed device whereby the ratio of movement between said support and tool carrier may be changed for cutting gears of different diameters, and said inclined support being adjustable whereby the machine may be adjusted for cutting gears of different diameters intermediate the diameters which the machine may be adjusted for by said change speed device.

11. In a machine for cutting involute gears, the combination of a pinion-supporting mandrel, an arm having an involute cam thereon, mounted concentrically with and adapted to rotate said mandrel, an inclined support for said cam, a cutting tool, a tool carrier having a feed transversely of said mandrel, means for moving said cutting tool in said carrier longitudinally of said mandrel, and means for automatically stopping said means for moving said cutting tool after the tool has completed cutting a tooth, and intermediate gearing between said tool carrier and inclined support, said inclined support being adjustable whereby the machine may be adjusted for cutting gears of different diameters without changing the ratio of movement between said support and tool carrier.

12. In a machine for cutting involute gears, the combination of a pinion-supporting mandrel, an arm having an involute cam thereon, mounted concentrically with and adapted to rotate said mandrel, an inclined support for said cam, a movable carrier for said inclined support, a cutting tool, a tool carrier having a feed transversely of said mandrel, and intermediate gearing between said tool carrier and inclined support, said intermediate gearing comprising a worm shaft engaging said inclined support carrier, said inclined support being adjustable whereby the machine may be adjusted for cutting gears of different diameters without changing the ratio of movement between said support and tool carrier.

In witness whereof, I have hereunto signed my name in the presence of two subscribing witnesses.

HENRI PERROT.

Witnesses:
J. W. R. TENNANT,
GEO. MCCORMACK.